United States Patent
Li et al.

(10) Patent No.: US 11,539,181 B2
(45) Date of Patent: Dec. 27, 2022

(54) SYSTEM AND METHOD FOR DETERMINING ABSOLUTE CARRIER-ENVELOPE PHASE OF ULTRASHORT LASER PULSES

(71) Applicant: Wayne State University, Detroit, MI (US)

(72) Inventors: Wen Li, Troy, MI (US); Suk Kyoung Lee, Troy, MI (US); Duke Debrah, Detroit, MI (US); Gabriel Stewart, Warren, MI (US)

(73) Assignee: Wayne State University, Detroit, MI (US)

( * ) Notice: Subject to any disclaimer, the term of this patent is extended or adjusted under 35 U.S.C. 154(b) by 62 days.

(21) Appl. No.: 17/072,237

(22) Filed: Oct. 16, 2020

(65) Prior Publication Data

US 2021/0119405 A1     Apr. 22, 2021

Related U.S. Application Data

(60) Provisional application No. 62/916,950, filed on Oct. 18, 2019.

(51) Int. Cl.
| | |
|---|---|
| *H01S 3/11* | (2006.01) |
| *G01J 11/00* | (2006.01) |
| *H01S 3/10* | (2006.01) |
| *H01S 3/00* | (2006.01) |
| *H01S 3/067* | (2006.01) |

(52) U.S. Cl.
CPC ............ *H01S 3/11* (2013.01); *H01S 3/10061* (2013.01); *H01S 3/005* (2013.01); *H01S 3/06712* (2013.01)

(58) Field of Classification Search
CPC ........ H01S 3/11; H01S 3/10061; H01S 3/005; H01S 3/06712; H01S 3/1305; H01S 3/1636; H01S 3/0092; H01S 3/1625; H01S 3/1307; H01S 3/0057; G01J 11/00
See application file for complete search history.

(56) References Cited

PUBLICATIONS

G. G. Paulus et al. "Absolute-phase phenomena in photoionization with few-cycle laser pulses", Nature 414, 182 (2001) (Year: 2001).*
S. K. Lee et al., "Coincidence ion imaging with a fast frame camera", Rev. Sci. Instrum. 85, 123303 (2014) (Year: 2014).*

(Continued)

*Primary Examiner* — Xinning(Tom) Niu
(74) *Attorney, Agent, or Firm* — Fishman Stewart PLLC (57) ABSTRACT

A system for determining an absolute carrier-envelope phase (CEP) of ultrashort laser pulses includes a laser system for generating a laser beam including ultrashort optical pulses of a duration of less than 10 fs, an ultrabroadband quarter-wave plate configured to polarize the laser beam, and a gas jet emitting a continuous jet stream into the laser beam. The system includes focusing optics to adjust a focal spot of the laser beam to the gas jet, and a detector arrangement including a beam block and a microchannel plate (MCP) imaging detector, wherein the laser beam is directed to the detector arrangement. The method involves using angular streaking to determine the absolute CEP of both elliptically and linearly polarized light.

20 Claims, 9 Drawing Sheets

(56) References Cited

PUBLICATIONS

Barth, I. and Smirnova O., "Nonadiabatic tunneling in circularly polarized laser fields: Physical picture and calculations," Phys. Rev., Dec. 2011, vol. 84, Iss. 6, 063415 (2011). DOI: 10.1103/PhysRevA.84.063415.

Miranda, M., Arnold, C. L., Fordell, T., Silva, F., Alonso, B., Weigand, R., L'Huillier, A. and Crespo, H., "Characterization of broadband few-cycle laser pulses with the d-scan technique," Opt. Express, Aug. 13, 2012, vol. 20, Iss. No. 17. pp. 18732-18743 (2012).

Lindner, F., Paulus, G. G., Walther, H., Baltuška, A., Goulielmakis, E., Lezius, M. and Krausz, F., "Gouy Phase Shift for Few-Cycle Laser Pulses," Phys. Rev. Lett., Mar. 19, 2004, vol. 92, No. 11, 113001. DOI: 10.1103/PhysRevLett.92.113001.

Ren, X., Summers, A. M., Raju P, K., Vajdi, A., Makhija, V., Fehrenbach, C.W., Kling, N.G., Betsch ,K. J., Wang, Z., Kling , M. F., Carnes, K. D., Ben-Itzhak, I., Trallero-Herrero, C., and Kumarappan, V., "Single-shot carrier-envelope-phase tagging using an f-2f interferometer and a phase meter: A comparison," J. Opt., Nov. 6, 2017, vol. 19, pp. 1-6, 124017.

Debrah , Duke A., Stewart, Gabriel A., Basnayake, Gihan, Tisch, John W.G., Kyoung Lee, Suk, and Li, Wen, "Direct in-situ single-shot measurements of the absolute carrier-envelope phases of ultra-short pulses," Opt. Lett., Jul. 15, 2019, vol. 44, No. 14, pp. 3582-3585.

Bergues, Boris, "The circular-polarization phase-meter," Opt. Express. Nov. 5, 2012, vol. 20, No. 23, pp. 25317-25324.

\* cited by examiner

SYSTEM AND METHOD FOR DETERMINING ABSOLUTE CARRIER-ENVELOPE PHASE OF ULTRASHORT LASER PULSES

CROSS REFERENCE TO RELATED APPLICATIONS

This application claims priority to Provisional Patent Application Ser. No. 62/916,950 filed Oct. 18, 2019, which is hereby incorporated by reference in its entirety.

STATEMENT REGARDING FEDERALLY SPONSORED RESEARCH OR DEVELOPMENT

This invention was made with government support under DE-SC0012628 awarded by DEPARTMENT OF ENERGY. The government has certain rights in the invention.

FIELD OF TECHNOLOGY

Exemplary fields of technology for the present disclosure relate to physical processes such as non-linear optics and coherent control, and more specifically to determination of absolute carrier-envelope phase (CEP) of driving ultrashort laser pulses.

BACKGROUND

A laser field with an intensity higher than $10^{13}$ W/cm² (electric field ~0.01 atomic units, or a.u.) will interact strongly and nonperturbatively with electrons in atoms and molecules. This interaction results in significant physical processes such as above-threshold ionization (ATI), above-threshold dissociation (ATD) and attosecond pulse production through high harmonic generation (HHG). In recent years, the advancement toward attosecond spectroscopy is closely related to the study of strong field ionization (SFI), which plays an important role in enabling the production of attosecond pulses as well as in triggering and probing processes that take place in a time scale from tens of attoseconds ($10^{-18}$ s) to a few femtoseconds ($10^{-15}$ s). In spite of intensive study, many fundamental aspects of SFI in atoms and molecules remain active research subjects, such as how to properly model and understand the multi-electron effect. This issue, arising from the nature of atoms and molecules being many-body objects, however, is not new and has been dealt with previously.

While many successful models such as the known three-step model and strong field approximation (SFA) did not consider Coulomb potential or multi-electron effects, in recent years many seemingly surprising experimental results were eventually attributed to the fact that Coulomb potential was underestimated. For example, in atomic single ionization by linearly polarized light, the cusp-like feature, the low-energy electron feature and near-zero energy electrons in photoelectron spectra are due to Coulomb potential effect. Furthermore, the double ionization yield is enhanced due to Coulomb focusing. In circularly or elliptically polarized light, photoelectrons exhibit an asymmetric momentum structure while PPT (Perelomov, Popov, Terentev) theory and SFA modeling predict symmetric momentum distribution in the plane of polarization.

A consensus has been somewhat reached that ignoring the Coulomb potential is perilous in understanding strong field dynamics. But, how much the Coulomb potential affects the results and to what extent it has to be considered are less clear. Many experimental results have been satisfactorily explained by invoking a Coulomb potential in the form of $-1/r$, in which r is the distance of the electrons from the ion core, even though what range of r needs to be considered is a nontrivial matter. For example, the near-zero energy feature assumes r to be more than a few hundred atomic units. Furthermore, in modeling the attoclock experiment, a short-range Yukawa potential in the form of $-e^r/r$ may be inadequate. However, some studies show that a single term soft-core Coulomb potential may not be sufficient in modeling the experiment results employing single active electron approximation: 1) in modeling the attoclock experiments in argon and krypton, three terms $$\left(-\frac{1}{r} - \frac{\phi(r)}{r} - \alpha_I \frac{r \cdot E(t)}{r^3}\right),$$

which correspond to Coulomb; screening; and ionic core polarization, respectively) are used in the numerical solution of time-dependent Schrodinger's equation (TDSE). 2) in modeling photoelectron angular distributions of naphthalene molecules by elliptically polarized light, additional terms describing core polarization may be added to the semiclassical trajectory calculations to achieve satisfactory agreement with experimental results.

The additional terms used in describing the potential that electrons experience after ionization is an indication of multi-electron effect. However, multi-electron effect also plays a role in the ionization process itself in the sense that more than one electron will respond to the laser field and electron correlation is likely to modify the overall results. Multi-electron dynamics have been observed in many previous studies, such as in high harmonic generation and strong field ionization. Various molecular systems ranging from diatomics to simple polyatomics have been shown to ionize into different cationic continua, which are generally believed to be coherent and thus will produce electronic wave packet motions on a few-femtoseconds time scale. A few examples have been shown using high harmonic spectroscopy and transient absorption spectroscopy. It can be hypothesized that because more than one continuum is involved, the resulting Coulomb potential will have different characteristics than those from a single continuum. If a sensitive and universal probe of such a potential can be found, a new window to multi-electron dynamics in strong field will be opened.

A few candidates for probing multi-electron dynamics are the photoelectron energy/momentum spectra and single/double ionization yields. Experimentally, however, measuring a single momentum distribution/spectra or ionization yield may not be sufficient because results from strong field experiments are typically convoluted with various experimental parameters such as intensity averaging and CEP phase averaging etc.

Photoelectron momentum spectra arising from ATI have been shown to be dependent on the CEPs of ultrashort laser pulses. This is due to the fact that CEP changes the time evolution of laser electric field significantly and thus directs the electrons asymmetrically to one side or the other. This fact was exploited to construct an ATI phasemeter which can measure the relative CEP of individual pulses with single-shot capability. Furthermore, it has been shown that the resulting photoelectron asymmetry is strongly modified by Coulomb potentials.

In recent years, many CEP-dependent measurements have been carried out, which generally are focused on using CEP as a "knob" to direct the ejection of atomic fragments or to control branching ratios of molecular dissociation exploiting the coupling between oscillating electric field and sub-cycle ionization and ensuing nuclear dynamics. An important technical issue with known approaches was the difficulty in obtaining the absolute CEPs directly. Known techniques for measuring CEP generally access the relative phase with a constant phase offset ((p) typically not decided. This makes a direct comparison between experiments and theory difficult. Further effort in determining this offset has always relied on theory. However, the quality of the theory and the appropriateness of employed assumptions (such as what type of potentials should be used in TDSE or semiclassical models) typically use experimental results to assess. This may therefore prevent an independent verification of calculation results, which would provide many details about the dynamics. Some effort has been carried out to calibrate this offset without an assumption using hydrogen atom in experiment for which TDSE calculations should be rigorously accurate, which has its own issues and problems.

Carrier-envelope phase, defined as the phase shift between the carrier wave and the intensity envelope of an ultrashort pulse $$E(t) = E_0 e^{(-\frac{t}{\tau})^2} \cos(\omega t + \phi),$$

is used to fully characterize the electric fields of such pulses. In nonlinear optics and strong field science, because the response of systems to intense laser pulses closely depends on the instantaneous electric field as well as the intensity, it is thus important to obtain CEP information besides the duration, spectra phase, amplitude etc. Determining CEP is even more important for few-cycle pulses because it dramatically shapes the temporal evolution of the electric field and can produce different results in light-matter interactions. For example, in high harmonic generation, absolute CEPs can determine whether a single isolated attosecond pulse or two pulses will be produced, assuming all other pulse parameters are equal.

Considerable effort have been made in measuring the relative CEP of ultrashort pulses, both in the fields of frequency metrology and high field science, and there have been efforts to estimate the absolute CEP. The f-to-2f interferometric method was developed to measure and stabilize the CEP of a frequency comb and was later adapted to single-shot measurements on pulses produced from Ti:Sapphire amplifier systems at multiple kHz. Others developed the known stereo ATI-phasemeter method, which exploits the phase-dependent above-threshold-ionization process (ATI). By measuring the photoemission asymmetry along the polarization direction at different energy ranges, the phase can be retrieved in real-time for pulses with repetition rates up to 100 kHz.

Even though the stereo-ATI phasemeter is able to estimate the absolute CEP, it employs the assumption based on classical calculations and the experimental accuracy is estimated to be $0.1\pi$. It is noted this result was achieved with a phase-stabilized laser and therefore not a single-shot measurement. Other studies have shown a correlation between CEP and experimental observables such as recoil momentum of produced cations. However, to estimate absolute CEP, comparisons between experimental and theoretical modeling were typically required.

The known methods typically use linearly polarized ultrashort pulses. One known proposal was set forth to measure the absolute CEP using circularly polarized light. In this proposal, due to the high nonlinearity of strong field ionization, the direction of the peak electric field in the plane of the polarization, which is uniquely associated with the absolute CEP, has the highest ionization rate. If the angle dependent ionization rates can be measured, the absolute CEP can be directly obtained. However, the final measured lab-frame angle is subject to uncertainty due to population depletion and Coulomb field deflection. Therefore, it can be applied to only a limited laser intensity range and to electrons within a certain energy range and cannot be carried out in single-shot fashion. As such, even though the proposal has inspired considerable research in revealing detailed dynamics of strong field ionization, an experiment to fulfill its main purpose of determining the absolute CEP of short pulses has yet to appear.

Thus, there is a need to determine absolute CEP of short pulses to enhance the observables that are sensitive to the multi-electron Coulomb potential.

BRIEF DESCRIPTION OF THE DRAWINGS

FIG. 6 illustrates that with a modification (using ions), the absolute CEP can be measured; and.

DETAILED DESCRIPTION

A system and method are disclosed for determining the absolute carrier-envelope phase of ultrashort laser pulses. Disclosed is a system and method which can measure the absolute CEP directly for both linearly and elliptically polarized light without resorting to theoretical calibrations.

According to the disclosure, the absolute CEP of each individual pulse can be measured with an angular steaking technique using elliptically polarized strong fields instead of circularly polarized light. Employing elliptically polarized light mitigates complicating factors (Coulomb field deflection and population depletion) and thus allows a direct correlation between the angle of electron ejection and the absolute CEP. This is achieved with single-shot/multi-shot photoelectron imaging using the disclosed apparatus and method that can access the full 2D momentum of electrons in the plane of polarization. This method can also be used for characterizing the absolute CEP of linearly polarized few-cycle pulses.

Figure 1A:
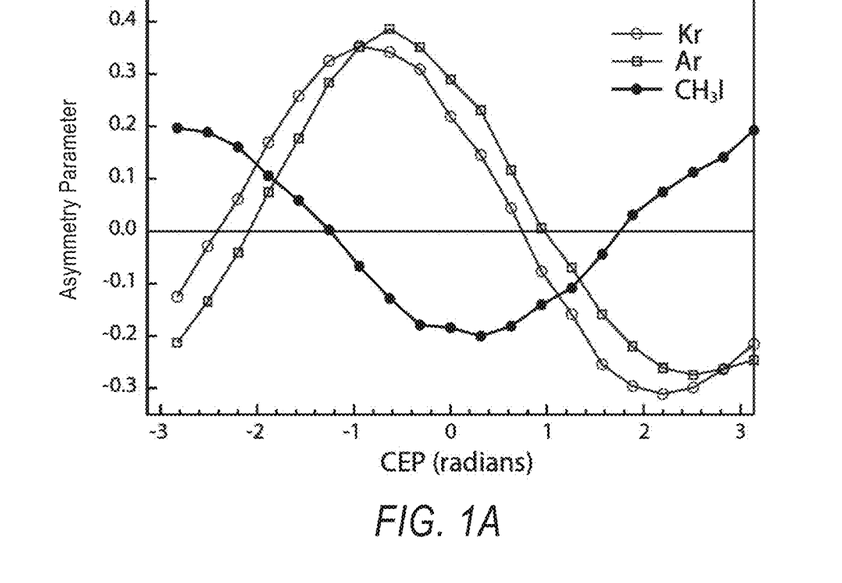
FIG. 1A illustrates different phase-dependent asymmetry parameters extracted from ATI photoelectron spectra for three different systems.
Figure 1B:
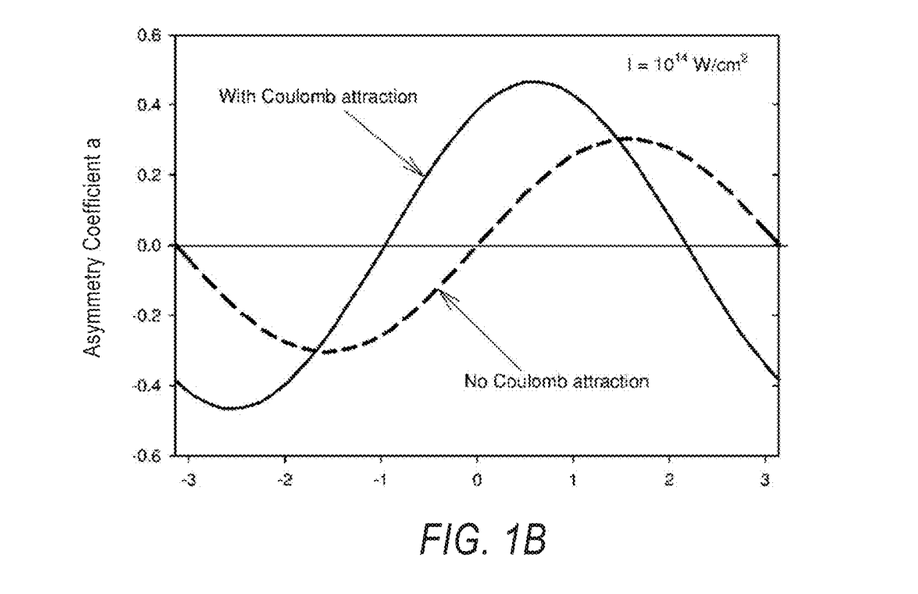
FIG. 1B illustrates results from theoretical calculations show the importance of including Coulomb potentials.

Referring to FIGS. 1A and 1B, an initial experiment illustrates that asymmetry strongly depends on the species, and thus the Coulomb potentials in spite of exactly the same experimental conditions applied. Illustrated is an initial probe of Coulomb potentials: phase-dependent asymmetry parameters. Preliminary experimental results showing different phase-dependent asymmetry parameters extracted from ATI photoelectron spectra for three different systems are shown in FIG. 1A. Note the phase is relative. In FIG. 1B the results from theoretical calculations show the importance of including Coulomb potentials to correctly calculate the asymmetry parameters (noting the phase is the absolute CEP). The asymmetry parameters are computed as $$\left(\frac{A_{left} - A_{right}}{A_{left} + A_{right}}\right),$$

in which A is the integrated signal with a momentum vector toward one side, right or left. Polarization of the laser is along left-right direction.

Referring to FIGS. 2A-2D, the principle of using elliptical polarized light to retrieve the absolute CEP through simulations is demonstrated.

Figure 2A:
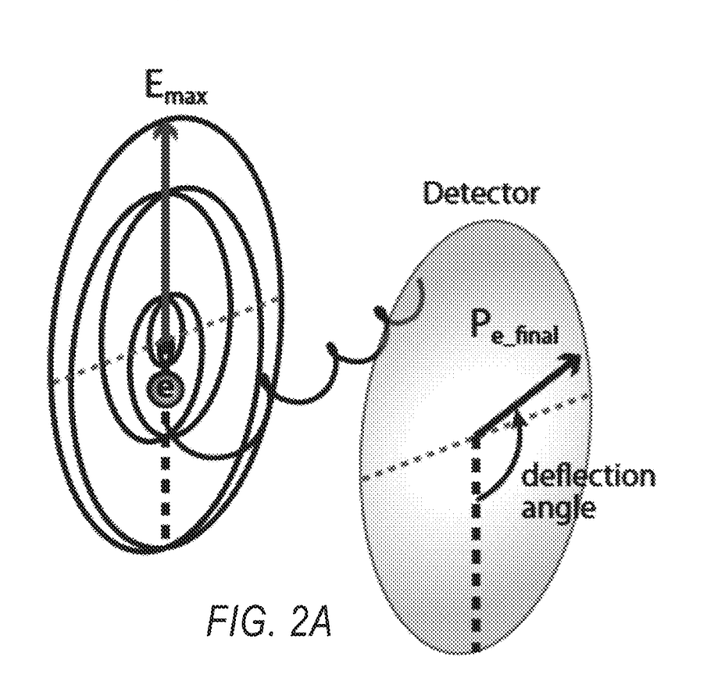
FIG. 2A shows a schematic of angular steaking of strong field ionized electrons by few-cycle circularly polarized pulses.
Figure 2B:
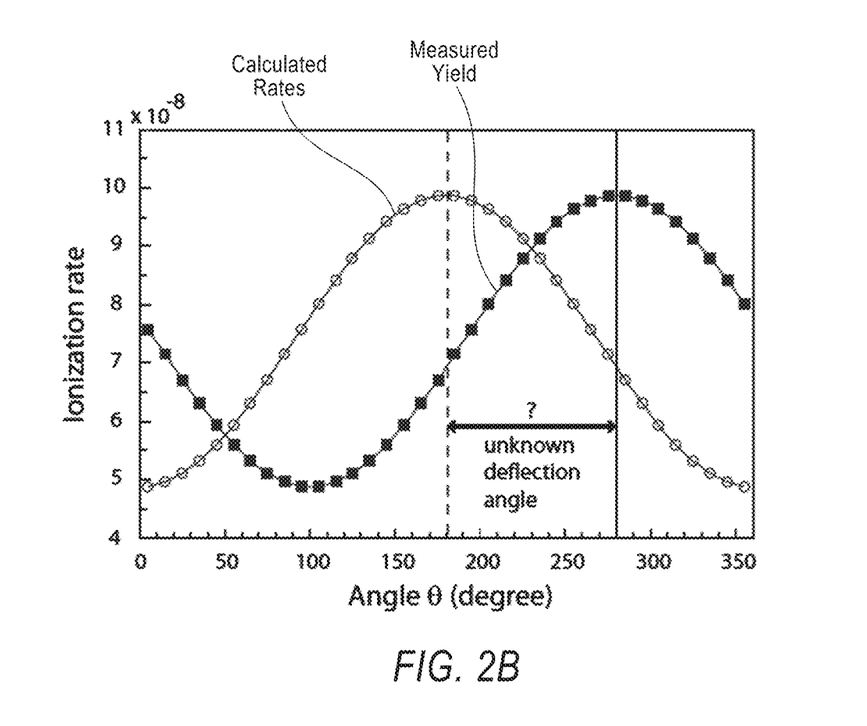
FIG. 2B shows calculated angle dependent ionization rates of a 5 fs circularly polarized pulse.
Figure 2C:
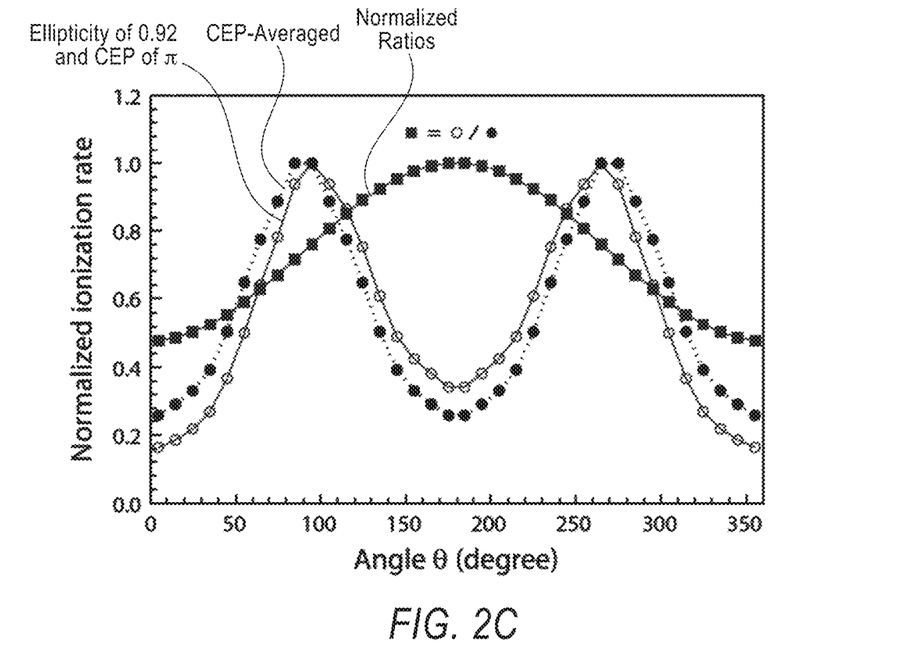
FIG. 2C shows calculated angle dependent ionization rates of the same pulse but with an ellipticity of 0.92 and a CEP of p.
Figure 2D:
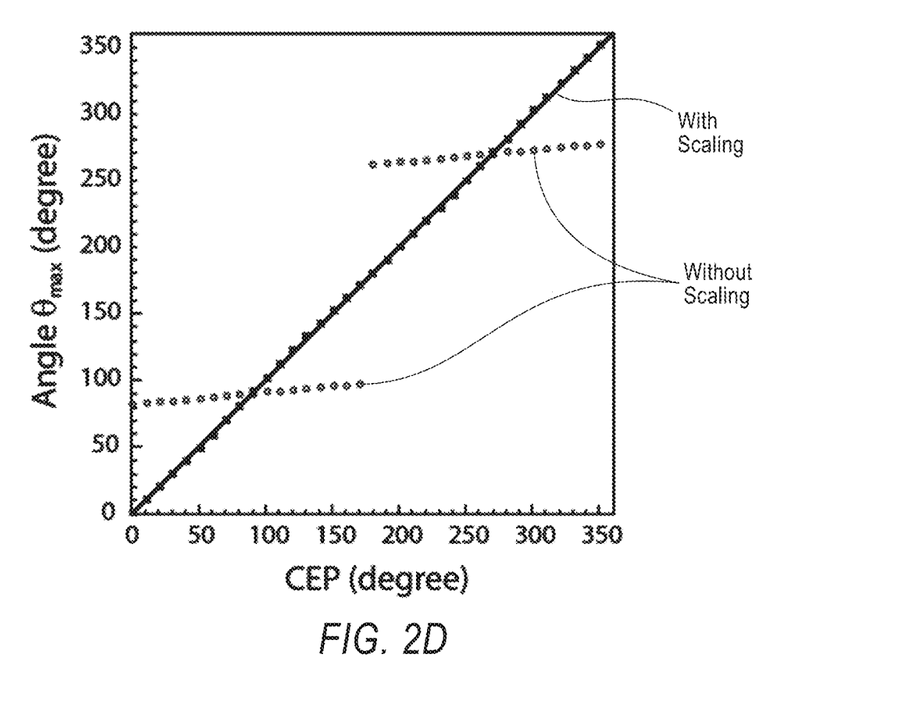
FIG. 2D shows angles with maximum yields obtained from angle dependent ionization rates with and without scaling.

FIG. 2A shows a schematic of angular steaking of strong field ionized electrons by few-cycle circularly polarized pulses. Electrons tunnel out at the direction opposite to the electric field and gain a final momentum in the laser field. For FIG. 2B, the calculated angle dependent ionization rates of a 5 fs circularly polarized pulse are shown. The calculated rates show a single peak at 180 degree, corresponding to an absolute CEP of π. However, due to an unknown deflection angle, from the supposedly measured yield, CEP cannot be determined. For FIG. 2C, the calculated angle dependent ionization rates of the same pulse but with an ellipticity of 0.92 and a CEP of π, the CEP-averaged angle dependent ionization rates with the same elliptically polarized pulse and the normalized ratios between the two cases, showing the CEP angle at 180 degrees was retrieved (noting the zero angles are different between FIGS. 2B and 2C) by the deflection angle. FIG. 2D shows angles with maximum yields obtained from angle dependent ionization rates with and without scaling by the CEP-averaged angle dependent ionization rates vs. the CEP. With scaling show an ideal or near perfect retrieval of all CEPs while without scaling only loosely depend on the CEPs. The modeling of strong field ionization did not model electron propagation after ionization.

As indicated above, experiments employing circularly polarized light have difficulties in determining the absolute CEP due to the unknown deflection angle between the electric field direction at the moment of ionization and the final lab-frame electron momentum (this will be π/2 without Coulomb field interaction and population depletion). With elliptical polarized light, such a deflection angle can be directly measured by integrating many single-shot electron images to average out the phase dependence while preserving the ellipticity dependence.

The angle between the measured minimum (maximum) yield angle and the minor (major) axis of the polarization ellipse is the deflection angle, which is the result of all effecting factors including the vector potential, Coulomb field deflection, population depletion and ionization delay. The latter three are difficult to assess directly and the topic of ionization delay is even controversial. By measuring the angle directly, uncertainty can be removed for the purpose of determining the absolute CEP. However, due to the ellipticity, each electron image does not have a single maximum yield angle anymore (FIG. 2C). Also, the angles with maximum yields only loosely depend on the absolute CEP (FIG. 2D). However, if the angle dependent yield of each image is scaled with the averaged angle dependent yield, the phase dependent yield can be fully recovered and thus the CEP angle can be extracted as shown in FIGS. 2C and 2D. Furthermore, if the angle of the lowest (highest) ionization yield is set in the averaged image to zero, the peak yield angle of each individual single-shot image will automatically become the absolute phase of the minor (major) axis of the electric field ellipse. In the illustrated case, the deflection angle is completely removed from the measurements regardless of its absolute value.

The disclosed implementation includes a detection system capable of measuring the 2D momentum of electrons in the plane of the polarization. For single-shot measurements, many electrons (e.g., greater than 500) need to be detected from a single laser shot in order to achieve reasonable statistics. A conventional 2D imaging detector, which combines microchannel plates (MCPs) and a phosphor screen is employed due to its massive multi-hit and 2D imaging capabilities. However, in a typical velocity map imaging (VMI) setup, in which the laser beam is propagated parallel to the plane of the detector, only one dimension of the electron momentum in the plane of the polarization can be accessed even though both momenta are required. Therefore, a different detector-laser beam configuration is needed. Thus, according to the disclosure, a new VMI setup is disclosed in which the laser beam is pointed at the detector and thus enables direct imaging of electrons' 2D momenta in the plane of polarization.

Figure 3:
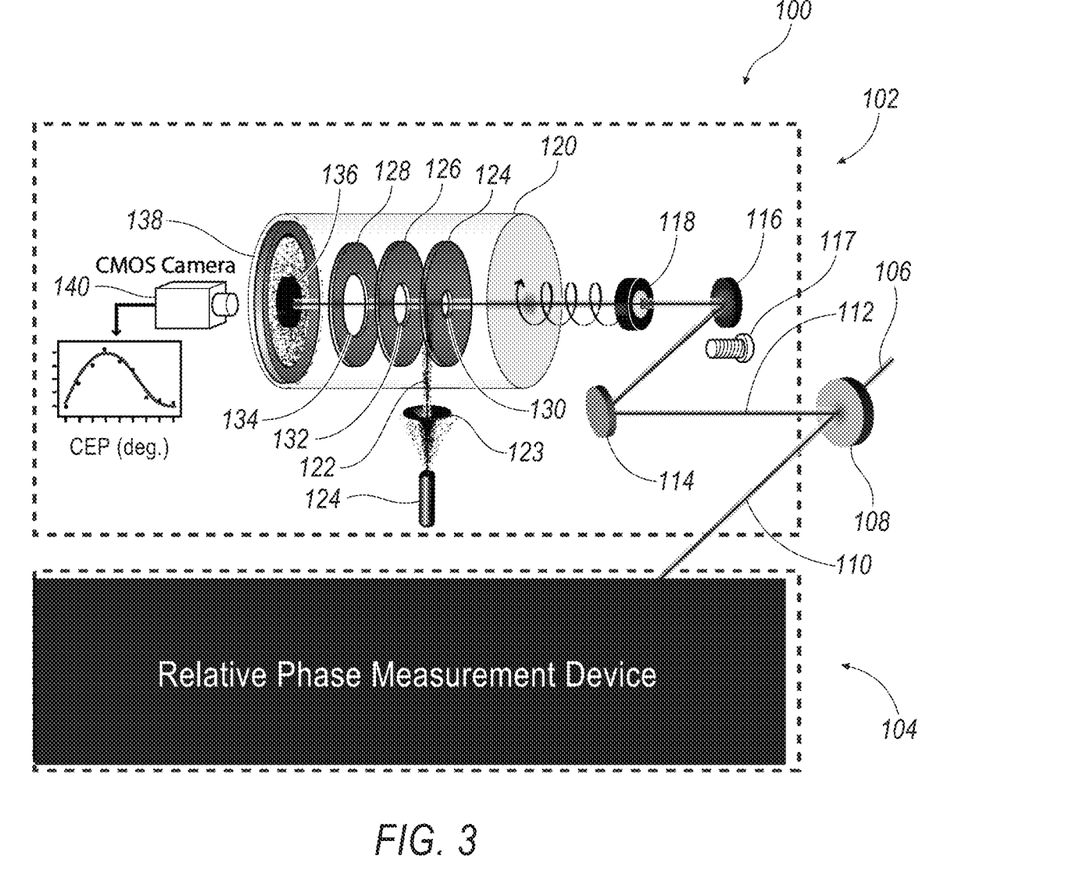
FIG. 3 illustrates an experimental or calibration setup including both a single-shot angular streaking apparatus and a relative phase measurement device.

FIG. 3 illustrates a schematic of an experimental setup 100 including both a single-shot angular streaking apparatus 102 and a relative phase measurement device 104. Relative phase measurement device 104 includes known apparatus and methods for determining relative phase measurement, and is illustrated for the purposes of demonstrating validation of measurements taken on single-shot angular streaking apparatus 102. Relative phase measurement device 104 may include a known f-to-2f technique or a known ATI-phase-meter, as examples.

For instance, in an arrangement where relative phase measurement device 104 employs a f-to-2f interferometer, the arrangement enables CEP measurements relying on the application of two optical nonlinearities, namely supercontinuum generation and second-harmonic generation. As an example of an f-to-2f measurement setup, both cameras (one for the f-to-2f arrangement and one for single-shot angular streaking apparatus 102) were run at 1 kHz, the same as the laser repetition rate. Each camera image of the angular streaking setup is centroided to identify individual electron hits and their positions were recorded. Each camera image of the f-to-2f setup was reduced to 1-D interference pattern and was then filtered and Fourier-transformed. The phase of each pulse was recorded. The exemplary experimental setup 100 includes and known f-to-2f arrangement, in one example.

Referring to FIG. 3, an input optical laser beam 106 emitted in less than 10 fs pulses, and in this example as ~4.3 fs pulses, and laser beam 106 is generated by passing 30 fs laser pulses generated from a commercial laser system through a hollow core fiber and a chirped mirrors sets, generating spectrum broadening and allowing for chirp compression, with optical pulses directed to a beam splitter 108. The optical pulses are in the range of approximately 400 nm to 1100 nm. Beam splitter 108 splits input laser beam 106 to a first beam 110 that passes to relative phase measurement device 104 which, if a f-to-2f arrangement includes a flat silver mirror, a focus lens, and a second harmonic generation crystal, from which it passes to a grating and ultimately to a CMOS camera. A second beam 112 is redirected by beam splitter 108. As indicated, however, relative phase measurement device 104 may instead include a known ATI-phasemeter or other device for measuring the relative phase.

Single-shot angular streaking apparatus 102 includes a mirror 114, which reflects second beam 112 to a concave mirror 116, which then reflects second beam 112 to a quarter waveplate (QWP) 118, which thereby passes to a velocity map imaging (VMI) chamber 120. Concave mirror 116, in one example, includes a 35 cm focal length and is mounted on a translational stage 117 to enable adjustment of a focal spot. VMI chamber 120 is a high-vacuum chamber having, in this example, $10^{-5}$ torr vacuum level or greater. Quarter waveplate 118, in the illustrated example, is an ultrabroadband quarter-wave plate configured to elliptically polarize the laser beam with an ellipticity equal or greater than 0 and smaller than 1, and may be in range of 0.8-0.95 in one example. A continuous beam or gas jet 122 of gas emanates from a beam source 124 and passes to second beam 112 via a skimmer 123, passing into VMI chamber 120 and between pulsing electrodes 124, 126, 128, which include progressively increasing diameter center holes 130, 132, 134, which accelerate electrons and ions alternatively out of an interaction region with the gas. Thus, upon passing therethrough, second beam 112 thereby passes to a beam block 136 and a MCP/phosphor imaging detector 138. MCP plate 138 is a micro-channel plate with phosphor screen, in this example. A CMOS camera 140, for detecting electrons generated, detects and images for CEP angle retrieval and outputs 142 a calibration. Thus, a detector arrangement 142 includes beam block 136 and MCP/phosphor imaging detector 138, wherein the laser beam points to detector arrangement 142.

Thus, FIG. 3 schematically describes the experimental setup. The ultrashort pulses utilized are generated by first broadening the spectrum of 30 fs pulses from a Ti:Sapphire amplifier laser system (KMLabs, Red Dragon, 1 mJ/pulse at 1 kHz), using an argon filled 1-m long hollow-core-fiber (ICON, Imperial College London) and being further compressed with 7 pairs of chirped mirrors (Ultrafast Innovations GmbH, PC70). The compressed pulses are fully characterized using a dispersion scan (D-scan) technique. The measured pulse duration was ~4.3 fs. The CEP of the laser was not stabilized. Using an ultrabroadband quarter-wave plate (United Crystals, AWP650-1100), an elliptically polarized light is obtained, in this example, with an ellipticity of 0.9. This beam is then loosely focused onto a continuous krypton gas jet (continuous beam 124), using a 35 cm focal-length concave mirror 123 mounted on a translational stage.

The focal spot of the laser beam is adjusted, via concave mirror 116, to be located after the atomic beam to minimize phase averaging arising from Gouy phase shift. In principle, any gas can be used in this disclosed setup because the angular streaking technique is universal. Krypton was used in this example because it has a relatively low ionization potential and provides a high count-rate for a single laser shot (>600 counts). The laser beam was stopped by a beam block located in front of the MCP detector 136. Beam block 136 has minimum effect on electrons, being situated in the center of the donut-shaped momentum distributions and thus does not block any signal. It is noted that similar detector-laser beam configurations have been employed previously for measuring photoemission from surface and photoelectrons produced by x-rays.

As such, to validate the phase measurement by the angular streaking technique, an f-to-2f interferometric setup is employed using a fast CMOS camera, which read out the f-to-2f fringes and performed real-time fast Fourier transform at 1 kHz to retrieve the relative CEP of each individual pulse. Thus, even though the f-to-2f method does not provide absolute CEPs, it may be used as a standard for estimating the precision of the angular streaking measurements.

And, as indicated, the above validation arrangement is described using an f-to-2f arrangement, but it is contemplated that other arrangements, such as a known ATI-phasemeter, may be used for relative phase measurement device 104.

Experimental setup 100 is shown to illustrate a validation arrangement for calibrating absolute CEP with a function of CEP angle, which when calibrated may then be applied to directly measure the in-situ absolute CEP with calibrated relative phase measurement methods according to the disclosure.

Figure 4A:
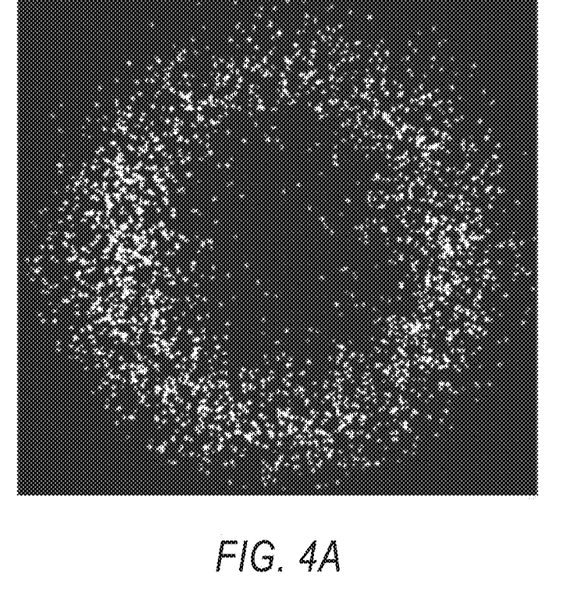
FIG. 4A shows a single-shot photoelectron image.
Figure 4B:
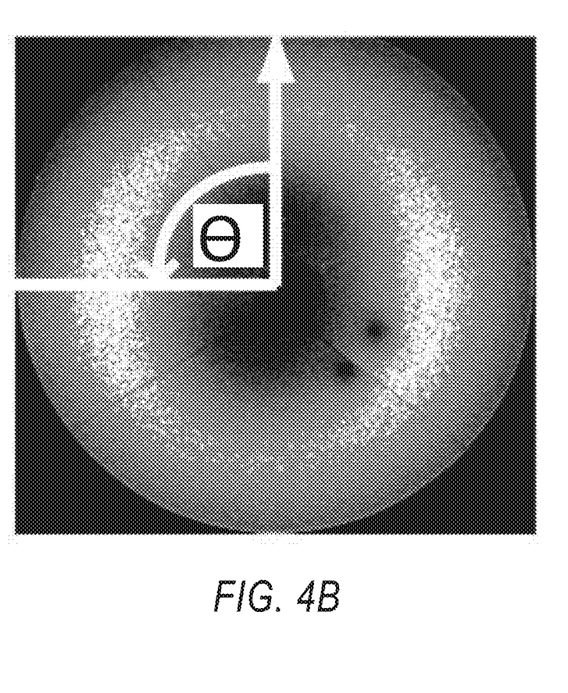
FIG. 4B shows an accumulated photoelectron image of 5000 laser shots.
Figure 4C:
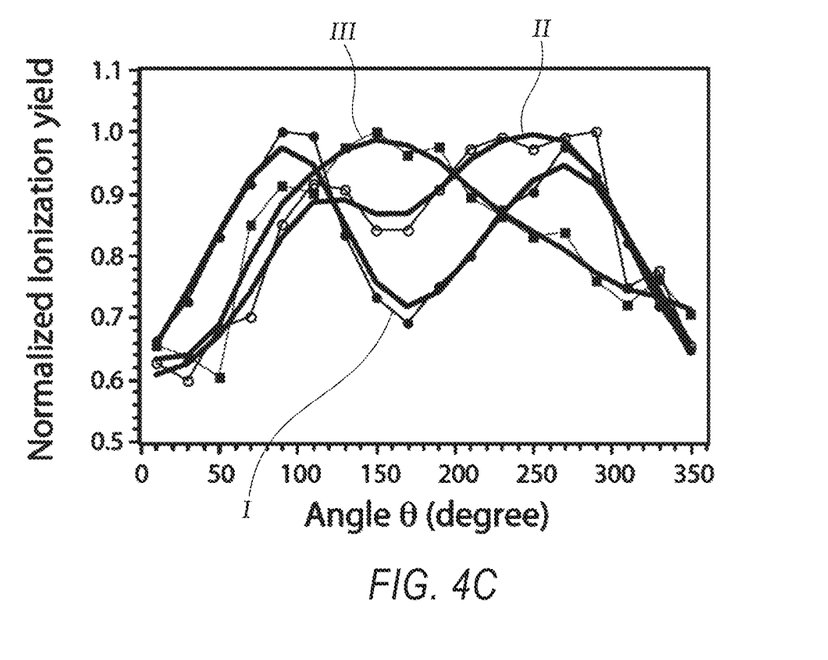
FIG. 4C shows 1D electron momentum angular distributions and their overlaid approximate fitting.
Figure 4D:
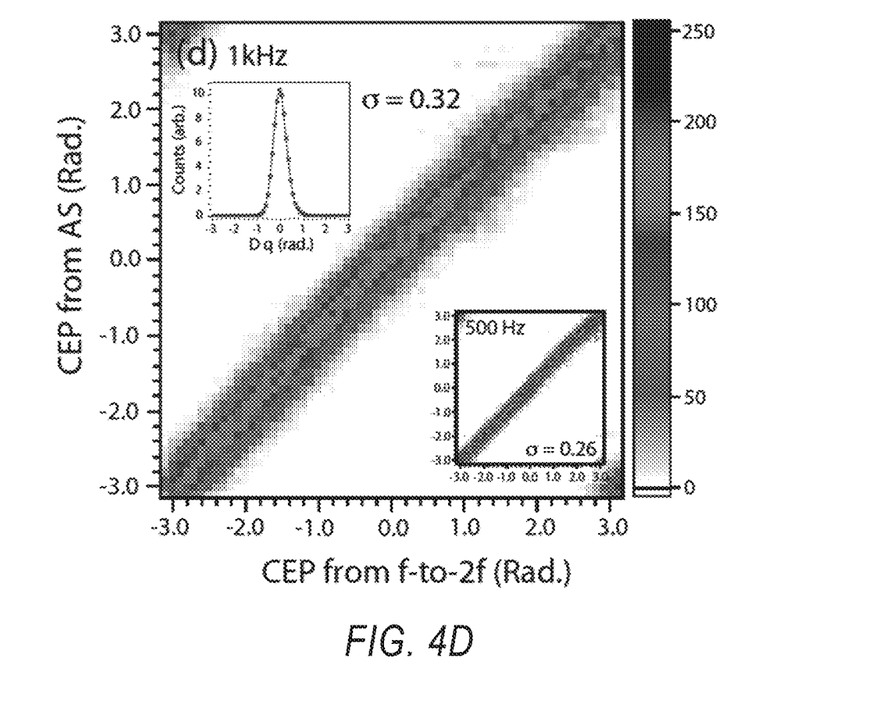
FIG. 4D shows a measured CEP correlation plot between the angular streaking and f-to-2f methods at a repetition rate of 1 kHz and 500 Hz.

Referring to FIGS. 4A-D, an absolute CEP phasemeter is described. FIG. 4A shows a single-shot photoelectron image, FIG. 4B shows an accumulated photoelectron image of 5000 laser shots, FIG. 4C shows 1D electron momentum angular distributions and their overlaid approximate fitting to the date, with label "I" showing phase averaged results; "II" showing single shot results, and "III" showing calibrated results showing the angle corresponding to the absolute CEP. FIG. 4D shows a measured CEP correlation plot between the angular streaking and f-to-2f methods at a repetition rate of 1 kHz and 500 Hz.

Few-cycle pulses are important in implementing proposed measurements for the reason that CEP effect is the most significant with few-cycle pulses. Using a dispersion scan setup (D-Scan) and a phase retrieval algorithm, the pulse duration was measured to be 4.3 fs (less than 2 cycles) and the power was 250 µJ/pulse at 1 kHz. A single-shot phasemeter is further developed based on angular streaking method for measuring the absolute CEP of each individual pulse at 1 kHz. With this technique, pulses generated from non-CEP-stabilized ultrafast amplifier systems can be tagged in real-time with their absolute CEP, as illustrated in FIGS. 3A-3C. Thus, the absolute CEP has been measured without inputs from theory, according to the disclosure.

Figure 5:
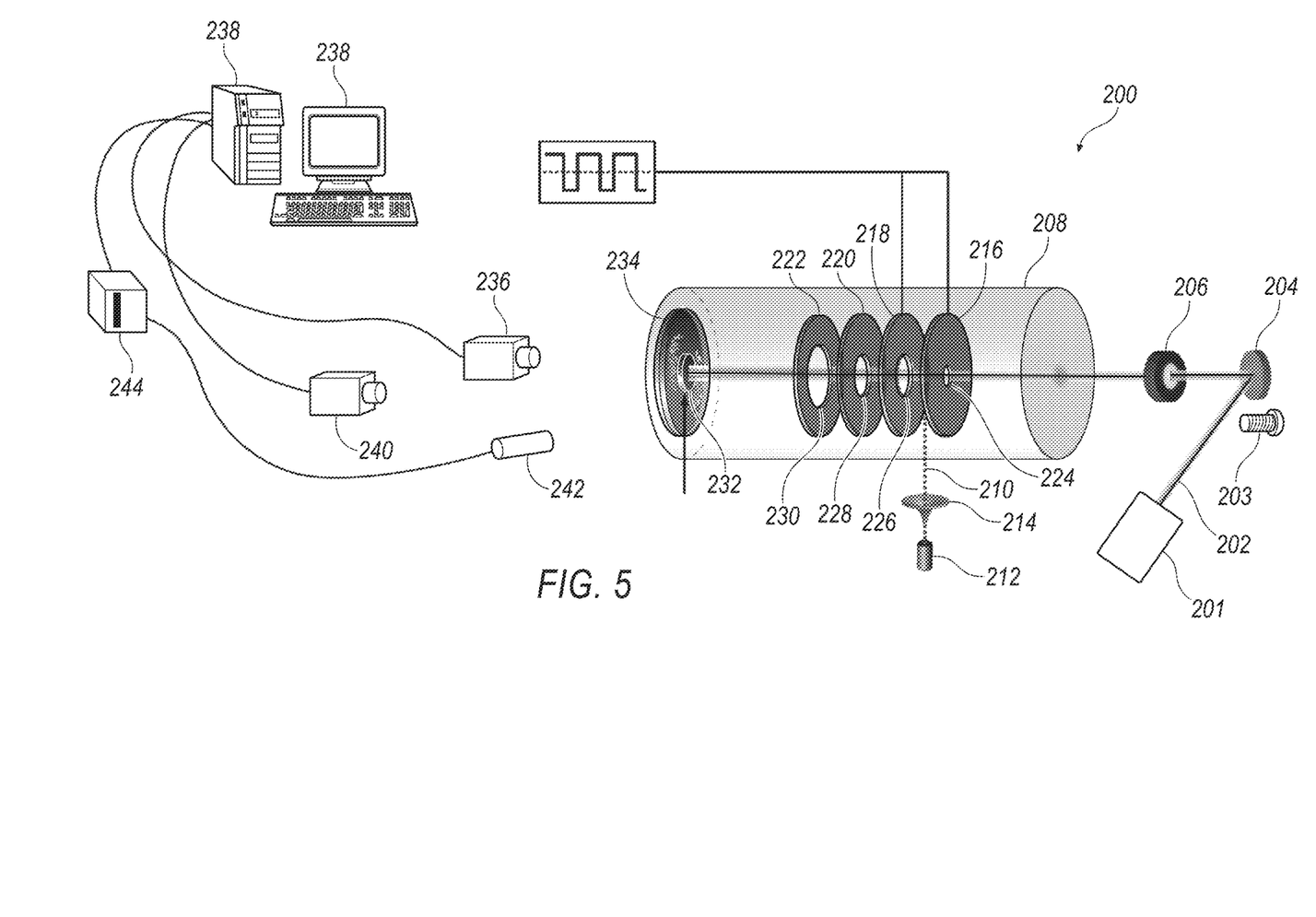
FIG. 5 illustrates a schematic illustration of a single-shot angular streaking apparatus or system according to the disclosure.

FIG. 5 illustrates a schematic illustration of a single-shot angular streaking apparatus or system 200 according to the disclosure. System 200 features two cameras: one for electron and one for ions as well as a pulsing electric field that accelerates electrons and ions alternatively out of an interaction region toward a single MCP/phosphor detector. 2D momenta are measured for both ions and electrons while full 3D momentum of ions can be achieved if ion counts are less than ten.

A laser system 201 emits a laser beam or optical pulses 202 emitted in less than 10 fs pulses, and in this example as ~4.3 fs pulses, and laser system 201 includes a hollow core fiber and chirped mirrors, generating short pulses and allowing for chirp compression. Laser beam 202 is redirected via a reflective and concave mirror 204 which reflects laser 202 to a quarter waveplate (QWP) 206, which thereby passes to a velocity map imaging (VMI) chamber 208. Concave mirror 204, in one example, includes a 35 cm focal length and is mounted on a translational stage to enable adjustment of a focal spot. VMI chamber 208 is a high-vacuum chamber having, in this example, $10^{-5}$ torr vacuum level or greater. Quarter waveplate 206, in the illustrated example, is an ultrabroadband quarter-wave plate configured to elliptically polarize the laser beam with an ellipticity greater than 0 and smaller than 1, and may be in range of 0.8-0.95 in one example. A continuous beam or gas jet 210 of gas emanates from a beam source 212 and passes to laser beam 202 via a skimmer 214, passing into VMI chamber 208 and between pulsing electrodes 216, 218, 220, 222, which include progressively increasing diameter center holes 224, 226, 228, 230 and accelerate electrons and ions alternatively out of an interaction region between the beam and a gas jet. The beam is then loosely focused onto a continuous krypton gas jet (continuous beam 210), using 35 cm focal-length concave mirror 204, which, in this example, is mounted on a translational stage 203 to adjust the focal spot. The focal spot is located after the atomic beam to minimize phase averaging arising from Gouy phase shift. As discussed above, any gas can be used in this disclosed setup because the angular streaking technique is universal.

Upon passing therethrough, laser beam 202 thereby passes to a beam block 232 and a microchannel plate (MCP) 234. MCP plate 234 is a micro-channel plate with phosphor screen, in this example. Various cameras and detecting devices may be used for obtaining the information shone from MCP plate 234. For instance, a CMOS camera 236, for detecting electrons generated, detects and images the CEP angle and outputs a calibration via a computer 238. Other options for obtaining the information may include a CMOS camera 240, for detecting ions (such as in an alternate arrangement when ions emanate from a plate used other than MCP plate 234), or a photo-multiplier tube (PMT) 242 may be used in conjunction with a digitizer 244, also where applicable.

Thus, FIG. 5 schematically describes an arrangement or system 200 that measures in-situ absolute CEP of ultrashort laser or optical pulses. The ultrashort pulses utilized are generated by first broadening the spectrum of 30 fs pulses from a Ti:Sapphire amplifier laser system (KMLabs, Red Dragon, 1 mJ/pulse at 1 kHz), using an argon filled 1-m long hollow-core-fiber (ICON, Imperial College London) and being further compressed with 7 pairs of chirped mirrors (Ultrafast Innovations GmbH, PC70). The compressed pulses are fully characterized using a dispersion scan (D-scan) technique. The measured pulse duration was ~4.3 fs. The CEP of the laser was not stabilized. Using an ultrabroadband quarter-wave plate (United Crystals, AWP650-1100), an elliptically polarized light is obtained, in this example, with an ellipticity of 0.9. This beam is then loosely focused onto a continuous krypton gas jet (continuous beam 210), using a 35 cm focal-length concave mirror mounted on a translational stage.

The focal spot is adjusted to be located after the atomic beam to minimize phase averaging arising from Gouy phase shift. As discussed, any gas can be used in this disclosed setup because the angular streaking technique is universal. Krypton is disclosed in this example because it has a relatively low ionization potential and provides a high count-rate for a single laser shot (>600 counts). The laser beam was stopped by beam block 232 located in front of MCP detector 234. Beam block 232 has minimum effect on electrons, being situated in the center of the donut-shaped momentum distributions and thus does not block any signal. It is noted that similar detector-laser beam configurations have been employed previously for measuring photoemission from surface and photoelectrons produced by x-rays.

As such, while the 3D-VMI apparatus provides the most differential data for analyzing dynamics, the less than 1 event/shot requirement for coincidence measurement can be limiting. A VMI-based covariance measurement setup was used, which enables 2D momentum imaging of both ions and electrons with a rate up to 1500 events/shot, as illustrated in FIG. 5, achieving 3D momentum imaging of ions for event rate below 10. The disclosed arrangement reduces necessary data acquisition time by a factor of 10 compared to that of coincidence measurements and thus improves efficiency. Another unique feature of the disclosed arrangement is that the laser beam points directly toward the detector. For circularly and elliptically polarized light, this configuration allows a direct access of the 2D momentum in the plane of polarization. This has enabled measurement of the absolute CEP of elliptically polarized light. Up to 1500 electrons/shot were detected to achieve single shot capability.

Computer 238 may include an overall network infrastructure through which any of a variety of devices, a server, and a database may communicate, for example, to transfer information between any portion thereof. In general, computer 238 may be a collection of computing devices and other hardware to provide connections and carry communications. The devices may include any computing device such as include a mobile device, cellular phone, smartphone, smartwatch, activity tracker, tablet computer, next generation portable device, handheld computer, notebook, laptop, projector device (e.g., three-dimensional holographic or hologram projector), or virtual reality or augmented reality device. The server may include any computing system and may generate by a processor executing a program and store by a memory and may further provide a web-based user interface (e.g., an internet portal) to be displayed by a user interface.

Computer 238 generally includes computer-executable instructions, where the instructions may define operations and may be executable by one or more devices such as those listed herein. Computer-executable instructions may be compiled or interpreted from computer programs created using a variety of programming languages and/or technologies, including, without limitation, and either alone or in combination, Java language, C, C++, Visual Basic, Java Script, Perl, SQL, PL/SQL, Shell Scripts, Unity language, labview, etc. The system 100, e.g., devices 102 and 104 and server 105 may take many different forms and include multiple and/or alternate components and facilities, as illustrated in the Figures. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computer 238 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices may include, without limitation, mobile devices, cellular phones, smart-phones, super-phones, next generation portable devices, mobile printers, handheld or desktop computers, notebooks, laptops, tablets, wearables, virtual or augmented reality devices, secure voice communication equipment, networking hardware, computer workstations, or any other computing system and/or device.

Figure 6:
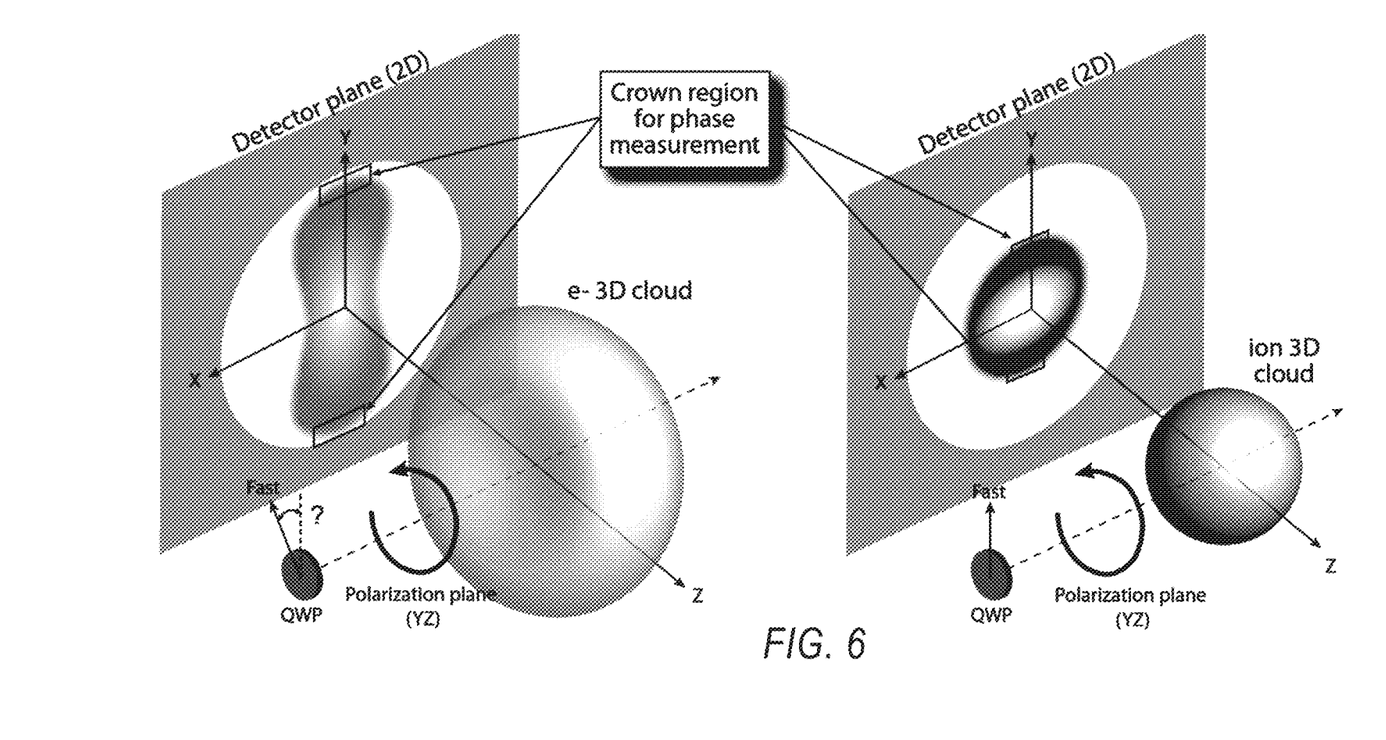

Referring now to FIG. 6, the disclosed absolute CEP phasemeter is based on angular streaking and single-shot electron imaging, which exploits the fact that for circularly or elliptically polarized light the direction of the peak electric field in the plane of the polarization, which is uniquely associated with the absolute CEP, has the highest ionization rate. The approach removes the requirement of theoretical calculations. The technique is suitable for elliptically polarized light and linearly polarized light. Thus, the disclosed method and apparatus translate to use with linearly polarized light.

Consequently, because the absolute CEP of both axes of the polarization ellipse are known from angular steaking measurements, by rotating the quarter waveplate to align either the fast or slow axis with the input polarization, the absolute CEP of the resulting linearly polarized light will be known.

The disclosed phasemeter has a unique and unusual laser-detector geometry, which allows direct access to the 2D electron momentum distribution in the plane of polarization. When such a geometry is not available, an apparatus capable of 3D-momentum imaging such as a cold target recoil momentum spectroscopy (COLTRIMS) with delay-line detectors can be employed to obtain the needed electron momentum distribution with multiple-laser-shot measurements. However, the acquisition time is likely to be long. When such an apparatus is not available, a method is devised to retrieve the absolute CEP with a typical 2D VMI. Thus, according to the disclosure the major axis of the electron image (ionization ellipse) is aligned parallel to the detector plane and to monitor the phase dependent yields of the electrons with the highest kinetic energy (the outmost part of the image). The peak position (phase) will be CEP zero for either the fast or slow axis of the quarter waveplate and then can be used for linearly polarized light.

As such, because the angle between the fast axis of QWP and the major axis of the ionization ellipse is not fixed, and depending on atomic/molecular target and laser intensity etc., uncertainty can be introduced such as in the 10 degrees range. This angle is not readily measured by 2D detectors such as those employed in typical 2D-VMI machines.

Thus, according to the disclosure the absolute phase is measured by detecting ions arising from dissociative single or double ionization, whose final momentum is not determined by the laser parameters or the Coulomb potential but instead by the inherent molecular property, especially with few-cycle pulses. The disclosed system has the following characteristics: 1) the angle dependent ionization rate is anisotropic and does not have an inversion symmetry; 2) fragmentation process is prompt or significantly faster than its rotation period. These two conditions will reveal the angular distribution of the detected ions will map out the angular dependent ionization rate, which in turn will reflect the absolute CEP. Methyl iodide is likely a good candidate because it satisfies both conditions, and with this type of molecules, one only needs to make sure the slow or fast axis for the QWP is parallel to the detector plane and then the peak or valley position (phase) of the yields will be CEP zero for the fast or slow axis. Ideally, the outmost of the image (fastest ions are used for monitoring the phase-dependent yield. An achromatic half waveplate can be used to rotate the input linear polarization while keeping the quarter waveplate fixed in its position.

Figure 7:
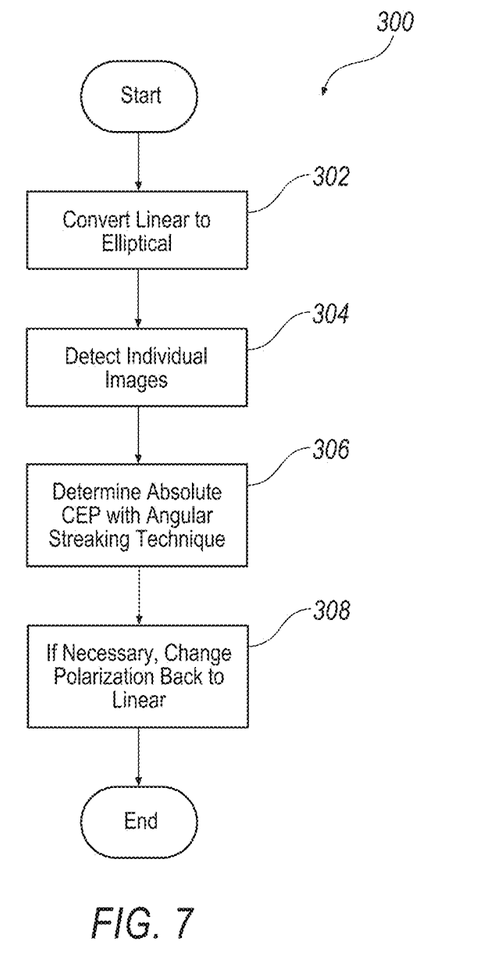
FIG. 7 illustrates a method of determining an absolute carrier-envelope phase (CEP) of ultrashort laser pulses.

Referring to FIG. 7, a method 300 of determining an absolute carrier-envelope phase (CEP) of ultrashort laser pulses includes the steps of 302 converting linear polarized light to elliptical polarized light with a broad band quarter wave plate, 304 detecting a plurality of individual images for each of the ultrashort laser pulses, 306 determining the absolute CEP of each of the ultrashort laser pulses with an angular streaking technique and, if necessary, at step 308 the elliptical polarization may be converted back to linear polarized light.". Step 308 may be employed because many applications include linearly polarized light, and the disclosed method can help measure the CEP of that through angular streaking.

The elliptically polarized strong electric field forms a polarization ellipse with a minor axis and a major axis, and method 300 further may include at least one of the following two intermediate steps, including 1) determining a deflection angle between a measured minimum yield angle and the minor axis of the polarization ellipse for each of the ultrashort laser pulses, and 2) determining the deflection angle between a measured maximum yield angle and the major axis of the polarization ellipse for each of the ultrashort laser pulses. The step of determining the absolute CEP of each of the ultrashort laser pulses includes scaling an angle-dependent yield of each image by dividing the angle-dependent yield by an averaged angle-dependent yield. The method further includes determining an absolute phase angle by defining an angle of zero degrees at the average minimum yield angle.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than those provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for determining an absolute carrier-envelope phase (CEP) of ultrashort laser pulses, comprising:
    a laser system for generating a laser beam including ultrashort optical pulses of a duration of less than 10 fs;
    an ultrabroadband quarter-wave plate configured to polarize the laser beam;
    a gas jet emitting a continuous jet stream into the laser beam;
    focusing optics to adjust a focal spot of the laser beam to the gas jet;
    a detector arrangement including a beam block and a microchannel plate (MCP) imaging detector, wherein the laser beam is directed to the detector arrangement;
    a camera positioned to receive emissions from the detector arrangement; and
    a hardware processor and a memory having a program communicatively connected to the hardware processor, the hardware processor being communicatively connected to the camera, the hardware processor providing operations including:
        directly accessing 2D momentum in a plane of polarization; and
        outputting an absolute carrier-envelope phase (CEP) of the ultrashort optical pulses.

2. The system of claim 1, wherein the optical pulses are of a duration of approximately 4.3 fs.

3. The system of claim 1, wherein the ultrabroadband quarter-wave plate polarizes the laser beam by elliptically polarizing the beam to an ellipticity between 0 and 1.

4. The system of claim 3, wherein the ellipticity is approximately 0.9.

5. The system of claim 1, wherein the focusing optics further include a concave mirror which directs the laser beam to a quarter waveplate (QWP), which thereby passes to a velocity map imaging (VMI) chamber.

6. A method of determining an absolute carrier-envelope phase (CEP) of ultrashort laser pulses comprising the steps of:
    converting linear polarized light to elliptical polarized light with a broad band quarter wave plate;
    detecting a plurality of individual images for each of the ultrashort laser pulses; and
    determining the absolute CEP of each of the ultrashort laser pulses with an angular streaking technique;
    wherein the elliptically polarized strong electric field forms a polarization ellipse with a minor axis and a major axis, the method comprising at least one of the following two intermediate steps:
        determining a deflection angle between a measured minimum yield angle and the minor axis of the polarization ellipse for each of the ultrashort laser pulses; and
        determining the deflection angle between a measured maximum yield angle and the major axis of the polarization ellipse for each of the ultrashort laser pulses.

7. The method of claim 6, wherein the step of extracting the absolute CEP of each of the ultrashort laser pulses includes scaling an angle-dependent yield of each image by dividing the angle-dependent yield by an averaged angle-dependent yield.

8. The method of claim 7, comprising the further step of determining an absolute phase angle by defining an angle of zero degrees at the average minimum yield angle.

9. A system for calibrating an absolute carrier-envelope phase of ultrashort optical pulses, comprising:
    a laser system for generating a laser beam including ultrashort optical pulses of a duration of less than 10 fs;
    a beam splitter positioned to receive the laser beam, from which emanates a first beam and a second beam;
    a first characterization system that includes:
    an ultrabroadband quarter-wave plate configured to polarize the first beam;
    a gas jet emitting a continuous jet stream into the first beam;
    focusing optics to adjust a focal spot of the first beam to the gas jet; and
    a detector arrangement including a beam block and a microchannel plate (MCP) imaging detector, wherein the first beam is directed to the detector arrangement; and
    a second characterization system that characterizes the second beam using an f-to-2f system.

10. The system of claim 5, wherein the focusing optics include a translational stage for adjusting the focal spot of the laser beam to the gas jet.

11. The method of claim 6, further comprising generating the linear polarized light using a laser having ultrashort optical pulses of a duration of less than 10 fs.

12. The method of claim 11, wherein the optical pulses are of a duration of approximately 4.3 fs.

13. The method of claim 11, further comprising converting the linear polarized light to the elliptical polarized light using a quarter-wave plate that polarizes the laser beam elliptically to an ellipticity between 0 and 1.

14. The system of claim 9, wherein the optical pulses are of a duration of approximately 4.3 fs.

15. The system of claim 9, wherein the ultrabroadband quarter-wave plate polarizes the laser beam by elliptically polarizing the beam to an ellipticity between 0 and 1.

16. The system of claim 15, wherein the ellipticity is approximately 0.9.

17. The system of claim 9, further comprising:
a camera positioned to receive emissions from the detector arrangement; and
a hardware processor and a memory having a program communicatively connected to the hardware processor, the hardware processor being communicatively connected to the camera, the hardware processor providing operations including:
directly accessing 2D momentum in a plane of polarization; and
outputting an absolute carrier-envelope phase (CEP) of the ultrashort optical pulses.

18. The system of claim 9, wherein the focusing optics further include a concave mirror which directs wherein the focusing optics include a translational stage for adjusting the focal spot of the laser beam to the gas jet.

19. A system for determining an absolute carrier-envelope phase (CEP) of ultrashort laser pulses, comprising:
a laser system for generating a laser beam including ultrashort optical pulses of a duration of less than 10 fs;
an ultrabroadband quarter-wave plate configured to polarize the laser beam;
a gas jet emitting a continuous jet stream into the laser beam;
focusing optics to adjust a focal spot of the laser beam to the gas jet; and
a detector arrangement including a beam block and a microchannel plate (MCP) imaging detector, wherein the laser beam is directed to the detector arrangement;
wherein the focusing optics further include a concave mirror which directs the laser beam to a quarter waveplate (QWP), which thereby passes to a velocity map imaging (VMI) chamber.

20. A method of determining an absolute carrier-envelope phase (CEP) of ultrashort laser pulses comprising the steps of:
converting linear polarized light to elliptical polarized light with a broad band quarter wave plate;
detecting a plurality of individual images for each of the ultrashort laser pulses;
determining the absolute CEP of each of the ultrashort laser pulses with an angular streaking technique; and
generating the linear polarized light using a laser having ultrashort optical pulses of a duration of less than 10 fs.

* * * * *